United States Patent
Liu et al.

(10) Patent No.: US 11,520,902 B2
(45) Date of Patent: Dec. 6, 2022

(54) METHODOLOGY FOR TRUSTWORTHY SOFTWARE BUILD

(71) Applicant: Futurewei Technologies, Inc., Plano, TX (US)

(72) Inventors: Haijun Liu, Shenzhen (CN); Long Chen, Cupertino, CA (US)

(73) Assignee: Futurewei Technologies, Inc., Addison, TX (US)

(*) Notice: Subject to any disclaimer, the term of this patent is extended or adjusted under 35 U.S.C. 154(b) by 238 days.

(21) Appl. No.: 16/812,090

(22) Filed: Mar. 6, 2020

(65) Prior Publication Data

US 2020/0364344 A1 Nov. 19, 2020

Related U.S. Application Data

(63) Continuation of application No. PCT/US2019/032260, filed on May 14, 2019.

(51) Int. Cl.
*H04L 29/06* (2006.01)
*G06F 21/57* (2013.01)
(Continued)

(52) U.S. Cl.
CPC .......... *G06F 21/577* (2013.01); *H04L 9/30* (2013.01); *H04L 9/3268* (2013.01); *G06F 2221/033* (2013.01)

(58) Field of Classification Search
CPC ... G06F 21/577; G06F 2221/033; H04L 9/30; H04L 9/3268
See application file for complete search history.

(56) References Cited

U.S. PATENT DOCUMENTS

2006/0122937 A1* 6/2006 Gatto ............... H04L 9/3263
705/51
2012/0005480 A1* 1/2012 Batke ................. G06F 21/44
713/175
(Continued)

FOREIGN PATENT DOCUMENTS

CN 106293865 A 1/2017
EP 2882156 A1 6/2015
WO WO-2014012106 A2 * 1/2014 ......... G06F 16/2358

OTHER PUBLICATIONS

Hemel, Armihn. "Discovering security defects in binary only software by fingerprinting." Jul. 21, 2014. (Year: 2014).*
(Continued)

*Primary Examiner* — Shawnchoy Rahman
(74) *Attorney, Agent, or Firm* — Schwegman Lundberg & Woessner, P.A.

(57) ABSTRACT

A certificate-based methodology is used to establish the trustworthy relationship between source codes and produced binary files for a given software build. The trustworthy relationship between the source code and binary files is generated by recording build information during building of the source code. The build information may include build environment information, framework information, source files identification, intermediately generated files information, final binary files information, file operations during building of the source code, and/or commands/operations during building of the source code. A certificate is generated using the build information for establishing a relationship between the source code and a binary file created from the source code, and the certificate is signed with a public cryptographic key. A software release package is provided to the recipient including at least the source code, final binary files generated from the source code, and the certificate.

20 Claims, 6 Drawing Sheets

(51) Int. Cl.
    *H04L 9/30*     (2006.01)
    *H04L 9/32*     (2006.01)

(56)     References Cited

U.S. PATENT DOCUMENTS

2017/0017798 A1    1/2017    Bhat et al.
2019/0065709 A1*    2/2019    Salomon ................ G06F 21/44

OTHER PUBLICATIONS

"International Application Serial No. PCT/US2019/032260, International Preliminary Report on Patentability dated Nov. 25, 2021", 10 pgs.
"International Application Serial No. PCT/US2019/032260, International Search Report dated Jan. 27, 2020", 4 pgs.
"International Application Serial No. PCT/US2019/032260, Written Opinion dated Jan. 27, 2020", 8 pgs.

* cited by examiner

FIG. 1

```
-----BEGIN PGP SIGNED MESSAGE-----
HASH: SHA256
```

TOOLS INTEGRITY CHECK 200:
```
T00001 MCB TOOL V1.0.0 1C6CAF914D1D8E70C143061673FAA7F1F53E1EF6D8962DDB0C82FE392E58056D
T00002 GCC        V7.3  1C1908208C8885F35A8B8760E53294B7D321261DB3F92ED9D32ECAB69B8F9EE4
-----OUTPUT-----
```

BINARY HASH 202:
```
B00001, BINTEST.EXE 8246019CA17111843D4B910B72CBDBEFC7FD36C879783B9CABA59C81BCB963AB
-----INPUT-----
```

CODE HASH 204:
```
C00001 TEST01.C    C51E2BD55234BA8B8124A2CD58A528858584841BDDD1F3F2598D0D68CC888440
C00002 TEST02.C    7FFBF9AC94BA6EFB9E50AD12AEAE31FD39C20D8F69B4BB9CC153EBBB81920879
C00003 TEST03.H    9A43B1C3BF696ACF5AEF7D44582EF2149FE4173FDB48AFEDF93BED530EA45613
...
L00001 LIBC.A      3920D5061D329400E73D71E7FFFED4F3B6D7F778F8DB1E9A092161DFB467A5FE2
-----BEGIN PGP SIGNATURE-----
```

SIGNATURE 206:
```
iQEzBAEBCAAdFiEEWrg8fsKMCTTN7/60T77uQYt3EA0FAwSHUkACgkQT77uQYt3
EA3Pmfg/cXWw9L1PnU828IkbUxk01x2apioykahPWzsludLzyWwfGd77J8YTDk
5IYAk61Dprx90N5va2bhZy0D0m+qTTco0omjGAzlyVDuLJmDLV9saPmHRmtToQ4Y
vrROldk+8kOXsRWnAtTBdukRwPmxnd0ErwW4R0KZIuwHhbBv/vkM2QKKIM6pRTHL2
Iw5ZTekaEOmye1ZpSDIUC3QsmfUoOeJuYHsAgGEgi1a3Kp0ydfGGfs/vm0Du0G8
B2/Wm/ToK3j53HJQY8N86LkYrQD9fmYPNgDUfHH5fzdMFK7hZq9Ei4c3zkVIVx1
5o5XQjg9l4mwYTkl2nQDz2jO+YJAw==
=v874
-----END PGP SIGNATURE-----
```

METHODOLOGY FOR TRUSTWORTHY SOFTWARE BUILD

CROSS REFERENCE TO RELATED APPLICATION

This application is a continuation application of and claims priority to International Application No. PCT/US2019/032260, filed May 14, 2019, entitled "Methodology for Trustworthy Software Build," the content of which is hereby incorporated by reference in its entirety.

TECHNICAL FIELD

This application is directed to a certificate-based methodology to establish the trustworthy relationship between input source code files and output binary files for a given software release.

BACKGROUND

When releasing software products in binary format and the corresponding source code to customers, code developers have been asked by customers to provide ways for the customers to verify that the received/released binary files were actually generated from the source code files delivered to them. Customers also wish to be able to check the source code for vulnerabilities, back doors, etc. that may have been introduced during the software build/compilation process.

Re-building of the same source code files is not a practical solution as re-building of the same source code files usually produces different binary files due to various factors such as timestamps, environment setup, compiler algorithms that introduce differences, etc. Therefore, a simple re-building could produce binary files that are different from the previous build, making it impossible to prove a genuine relationship between the source code files and the binary files generated from another build process. Extensive manual analyses and work must be performed to make the regenerated binary files match the ones from another build process. For example, the build system may be made entirely deterministic whereby transforming a given source code always creates the same result. In such a case, the current date and time must not be recorded, and the output always has to be written in the same order. Also, the set of tools used to perform the build and more generally the build environment should either be recorded or pre-defined. In addition, users may manually recreate a close enough build environment, perform the build process, and validate that the output matches the original build. However, such efforts are tedious, and attempts to achieve 100% byte-to-byte matching is not possible as there is no known method to handle all factors that may cause changes in regenerated binary files.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

In sample embodiments described herein, it is desired to verify the trustworthy relationship between source code and binary files generated from the source code. In particular, it is desired to record the names and the corresponding fingerprints (e.g., hash values) of the input files, the names and the fingerprints of the intermediately generated files, the names and the fingerprints of the final output files, the fingerprints of the build environment, the fingerprints of a trustworthy software build (TSB) tool, all file operations that occur during the build process, and the exact commands/operations and the order of the commands/operations and then to generate a certificate and sign it with a public cryptography key for inclusion in the software release package. The build certificate may be used as the central piece for the trustworthiness verification. Instead of trying to modify the generated binary files and to match them to a previously generated baseline file, the systems and methods described herein implement a certificate-based methodology that establishes a trustworthy relationship between the input (i.e., the source code) and the output (i.e., binary files) for a given software build.

A first aspect of the present disclosure relates to a computer-implemented method of establishing a trustworthy relationship between source code and binary files generated from the source code. The method includes recording build information during building of the source code and generating a certificate using the build information for establishing a relationship between the source code and a binary file created from the source code. The certificate is signed with a public cryptographic key and is usable to verify that the binary file referenced in the certificate has been created from the source code referenced in the certificate.

In a first implementation according to the first aspect as such, a software release package is provided to the recipient where the software release package includes the source code, the final binary files generated from the source code, and the certificate.

In a second implementation according to the first aspect or any preceding implementation of the first aspect, a fingerprint generation algorithm generates a recorded build information fingerprint.

In a third implementation according to the first aspect or any preceding implementation of the first aspect, the recorded build information fingerprint is received and is cross-checked against a fingerprint generated by a tool used during building of the source code to verify that no modification has been made to a file between a time that the recorded build information fingerprint was generated and a time that the fingerprint was generated by the tool.

In a fourth implementation according to the first aspect or any preceding implementation of the first aspect, the signed certificate is encrypted with the public cryptographic key or another cryptographic key depending on requirements for a given build instance of the source code.

In a fifth implementation according to the first aspect or any preceding implementation of the first aspect, the public cryptographic key for signing the certificate is provided by a recipient or a trusted third party.

In a sixth implementation according to the first aspect or any preceding implementation of the first aspect, the build information comprises at least one of build environment information, framework information, source files identification, intermediately generated files information, final binary files information, file operations during building of the source code, and commands/operations during building of the source code.

A second aspect of the present disclosure relates to a computer-implemented method of verifying trustworthiness of binary code received by a recipient. The method includes receiving a software release package including at least source code, final binary files generated from the source code, and a certificate. In sample embodiments, the certificate includes build information for establishing a relationship between the source code and the binary files created from the source code and is signed with a public cryptographic key. In sample embodiments, the build information is recorded during building of the source code. The recipient's private cryptographic key is used to verify if the certificate included in the software release package is free of modification. Fingerprints of the source code and final binary files included in the software release package are locally generated and compared to fingerprints of the source code and final binary files included in the software release package. When the locally generated fingerprints and the fingerprints in the software release package match, it is determined that the source code and final binary files included in the software release package are trustworthy.

In a first implementation according to the second aspect as such, the certificate is decrypted when the certificate is encrypted.

In a second implementation according to the second aspect as such or any preceding implementation of the second aspect, generating the fingerprints of the source code and final binary files included in the software release package includes generating fingerprints of the source code and the final binary code using a fingerprint generation algorithm known to the recipient and a provider of the software release package.

In a third implementation according to the second aspect or any preceding implementation of the second aspect, the build information comprises at least one of build environment information, framework information, source files identification, intermediately generated files information, final binary files information, file operations during building of the source code, and commands/operations during building of the source code.

A third aspect of the present disclosure relates to a software build tool that establishes a trustworthy relationship between source code and binary files generated from the source code. The software build tool includes a fingerprint engine that records build information during building of the source code and that fingerprints of the build information. The software build tool also includes a certificate generation engine that generates a certificate using the build information for establishing a relationship between the source code and a binary file created from the source code and that signs the certificate with a public cryptographic key. The signed certificate is usable to verify that the binary file referenced in the certificate has been created from the source code referenced in the certificate.

In a first implementation according to the third aspect as such, the software build tool further includes a command engine that instructs a compiler to compile the source code into the binary files, organizes the source code, identifies commands for execution by the compiler, and invokes the compiler to execute the identified commands In a second implementation according to the third aspect as such or any preceding implementation form of the third aspect, the software build tool further includes a software release package generator that generates a software release package including at least the source code, final binary files generated from the source code, and the certificate.

In a third implementation according to the third aspect as such or any preceding implementation form of the third aspect, the software release package generator encrypts the signed certificate with the public cryptographic key or another cryptographic key depending on requirements for a given build instance of the source code.

In a fourth implementation according to the third aspect as such or any preceding implementation form of the third aspect, the fingerprint engine processes a fingerprint generation algorithm to generate recorded build information fingerprints.

In a fifth implementation according to the third aspect as such or any preceding implementation form of the third aspect, the fingerprint engine further cross-checks the recorded build information fingerprint against a fingerprint generated by a tool used during building of the source code to verify that no modification has been made to a file between a time that the recorded build information fingerprint was generated and a time that the fingerprint was generated by the tool.

In a sixth implementation according to the third aspect or any preceding implementation of the third aspect, the build information comprises at least one of build environment information, framework information, source files identification, intermediately generated files information, final binary files information, file operations during building of the source code, and commands/operations during building of the source code.

A fourth aspect of the present disclosure relates to a software build tool that verifies trustworthiness of binary code received by a recipient. The software build tool includes a software release package including at least source code, final binary files generated from the source code, and a certificate. In sample embodiments, the certificate includes build information for establishing a relationship between the source code and the binary files created from the source code and is signed with a public cryptographic key. The build information is recorded during building of the source code. A certificate engine is further provided including the recipient's private cryptographic key to verify if the certificate included in the software release package is free of modification. A fingerprint engine is also provided that locally generates fingerprints of the source code and final binary files included in the software release package and compares fingerprints of the source code and final binary files included in the software release package against the locally generated fingerprints for use in determining that the source code and final binary files included in the software release package are trustworthy when the locally generated fingerprints and the fingerprints in the software release package match.

In a first implementation according to the fourth aspect as such, the software build tool decrypts the certificate when the certificate is encrypted.

In a second implementation according to the fourth aspect as such or any preceding implementation form of the fourth aspect, the fingerprint engine of the software build tool includes a fingerprint generation algorithm known to the recipient and a provider of the software release package that generates the fingerprints of the source code and the final binary files.

In a third implementation according to the fourth aspect or any preceding implementation of the fourth aspect, the build information comprises at least one of build environment information, framework information, source files identification, intermediately generated files information, final binary files information, file operations during building of the source code, and commands/operations during building of the source code.

The methods described herein can be performed and the instructions on computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

It should be understood at the outset that although an illustrative implementation of one or more embodiments are provided below, the disclosed systems and/or methods described with respect to FIGS. 1-6 may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

In sample embodiments, instead of trying to modify the generated binary files and to match them to a previously generated baseline file, a certificate-based methodology is implemented to establish the trustworthy relationship between the inputs (i.e., the source codes) and the outputs (i.e., binary files) for a given build process including any source code and libraries used during the build process. The mechanism includes two stages. The first stage is for the software release preparation, which is to be performed by the software provider, and the second stage is for the trustworthy verification, which is to be performed by the customer or other interested entities.

During the software release preparation, a trustworthy software build (TSB) tool is used, which can be imple- mented as standalone software or a new feature/plugin to an existing building tool, such as GNU make. For a build instance, certain build information, including the names and the corresponding fingerprints (e.g., hash values) of the input files, the names and the fingerprints of the intermediately generated files, the names and the fingerprints of the final output files, the fingerprints of the build environment including the hardware information, operating system information, compiler/linker, the fingerprints of the TSB tool, all file operations that have occurred during the build process (e.g., renaming or relocating files), and the exact commands/operations and the order of the commands/operations are recorded. Then, based on the recorded information, the TSB tool generates a certificate and signs it with a public cryptography key, which is provided by the customer or a trusted third party. The information in the certificate can be plaintext or encrypted with the same or a separate public cryptographic key, depending on the specific requirements for given software releases. The release package includes the source code, intermediately generated files (optionally), final binary files, and the certificate.

Figure 1:
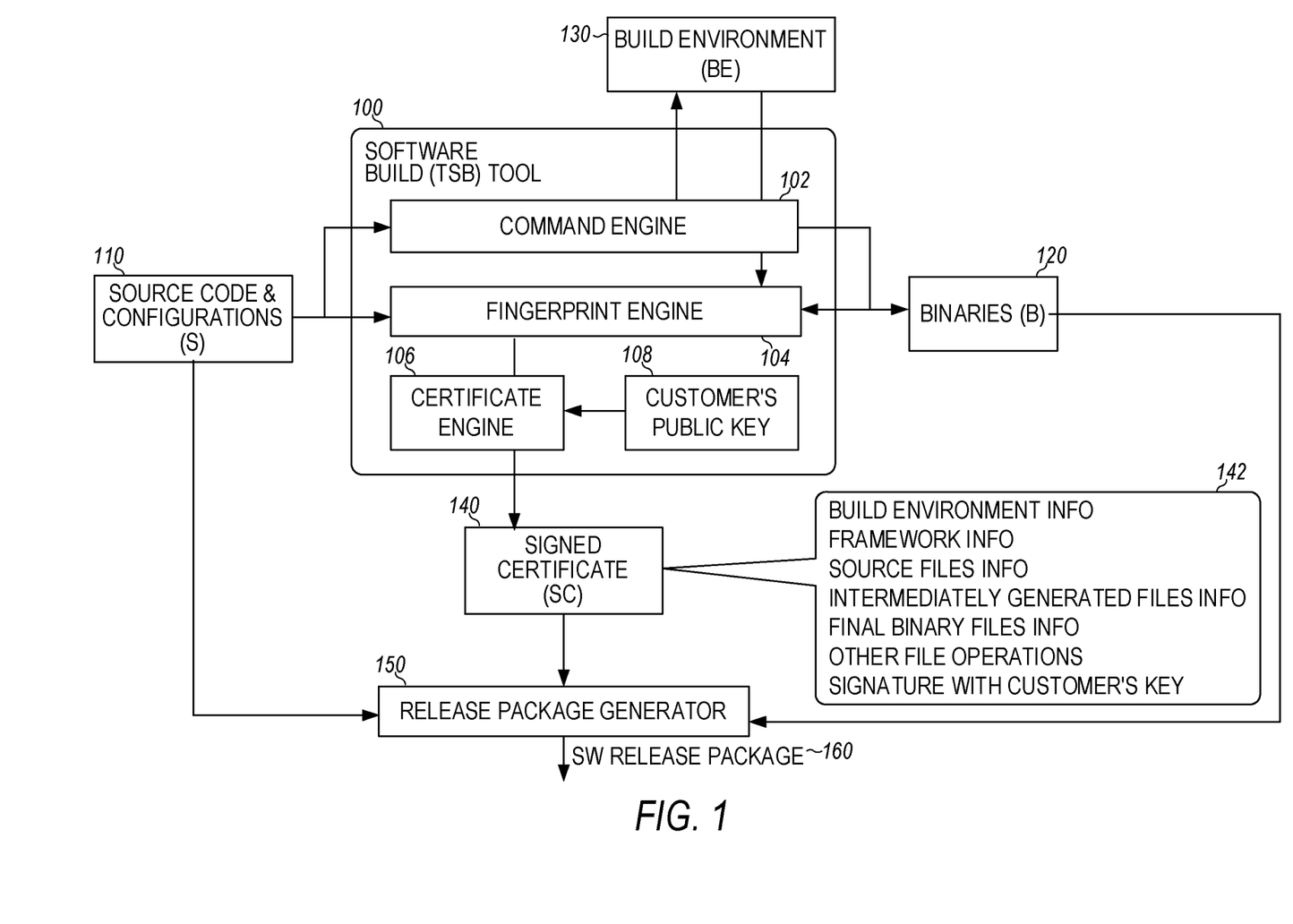
FIG. 1 illustrates the major components of a trustworthy software build (TSB) device using by a software developer and the content of a generated certificate in a sample embodiment.

FIG. 1 illustrates the major components of the trustworthy software build (TSB) device 100 as described herein and the content of a generated certificate in a sample embodiment. As illustrated in FIG. 1, the major components of the TSB device 100 may include a command engine 102 that includes circuitry, a subroutine, or other means for compiling source code 110 into binary files 120, for organizing the source code 110, for identifying commands for execution by a compiler or other tools, and for invoking the compiler or other tools to execute the identified commands The major components of the TSB device 100 may further include a fingerprint engine 104 that includes circuitry, a subroutine, or other means for recording the build data and for generating a fingerprint for each identified hardware and software element. The TSB device 100 may also include a certificate engine 106 that includes circuitry, a subroutine, or other means for processing a hashing algorithm created by the developer and the customer or a trusted third party that is not related to the customer's public key to generate certificates including hashes of the source code, binary code, and signatures from the tools in the build environment 130 and TSB tool 100. The customer's public key may be stored in a memory 108, a secure device, or be obtained from a remote server provided by a customer or a trusted party. The customer public key is provided to the certificate engine 106 for signing the digital certificate. In sample embodiments, the command engine 102 and the fingerprint engine 104 receive the original source code and configuration data 110 and together generate the binary files 120.

In the sample embodiments, data describing the build environment (BE) 130 is provided to the fingerprint engine 104 in response to control signals from the command engine 102. As just noted, for a build instance, certain building information, including the names and the corresponding fingerprints (e.g., hash values) of the input files, the names and the fingerprints of the intermediately generated files, the names and the fingerprints of the final output files, the fingerprints of the build environment 130, the fingerprints of the TSB tool 100, all file operations that have occurred during the build process, and the exact commands/operations and the order of the commands/operations, are recorded by the fingerprint engine 104 and provided to the certificate engine 106 for use in generation of the signed certificate (SC) 140. The certificate engine 106 of the TSB tool 100 generates the certificate and signs it with a public cryptography key, which is provided by the customer or a trusted third party as noted above. The information in the signed certificate 140 can be plaintext or encrypted with the same or a separate public cryptographic key, depending on the specific requirements for given software releases. In sample embodiments, the TSB tool 100 further includes a release package generator 150 including circuitry, a subroutine, or other means for generating a software release package 160 that is transmitted to the customer. In sample embodiments, the software release package 160 includes the source code files 110, intermediately generated files (optional), final binary files 120, and the signed certificate 140.

As illustrated in FIG. 1, the signed certificate 140 includes a variety of information 142 that establishes the trustworthiness that the binary files 120 are generated from the provided source code files 110. For example, the information 142 may include, inter alia, information regarding the build environment 130, the software framework of a trustworthy build including the root of trust, the source code files 110 including any path and hash values, the final binary files 120, other operations performed on the files by TSB tool 100, and the signature with the customer's public key from memory 108. Optionally, any intermediately generated files that are generated by the compiler and not necessarily used by the resulting software product may also be included in the information 142.

Figure 2:
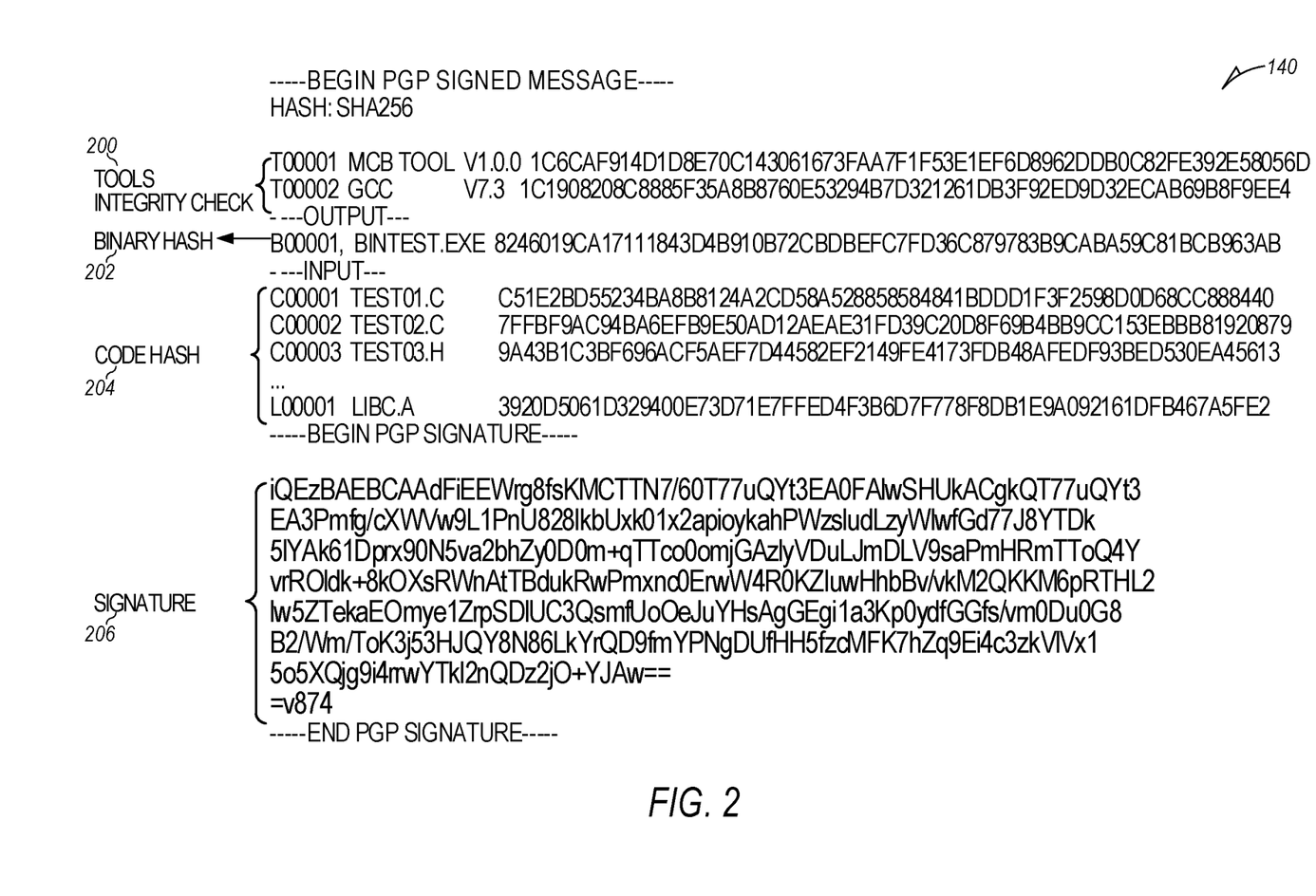
FIG. 2 illustrates a sample signed certificate including tools integrity check data regarding the tools used to create the binary files, output binary hash data, a code hash identifying the input source code files, and an appended signature.

As illustrated in FIG. 2, a sample signed certificate 140 may include tools integrity check data 200 regarding the tools used to create the binary files 120 (e.g., TSB systems hashing tool and GCC (GNU Compiler Collection) framework), output binary hash data 202, a code hash 204 identifying the input source code files 110 (e.g., C00001, C00002, and C00003) and libraries (e.g., L00001), etc. used in the build process, and an appended signature 206. It is noted that no file renaming, intermediate files, or file operations are required. This data may be optionally provided in the signed certificate 140. The data in the signed certificate 140 is typically hashed using a conventional hash algorithm such as SHA256. In sample embodiments, the code hash 204 may also include information identifying any intermediately generated files, and the tools integrity check data 200 may include information identifying the software framework and other file operations used by the TSB tool 100 during the software build process.

Figure 3:
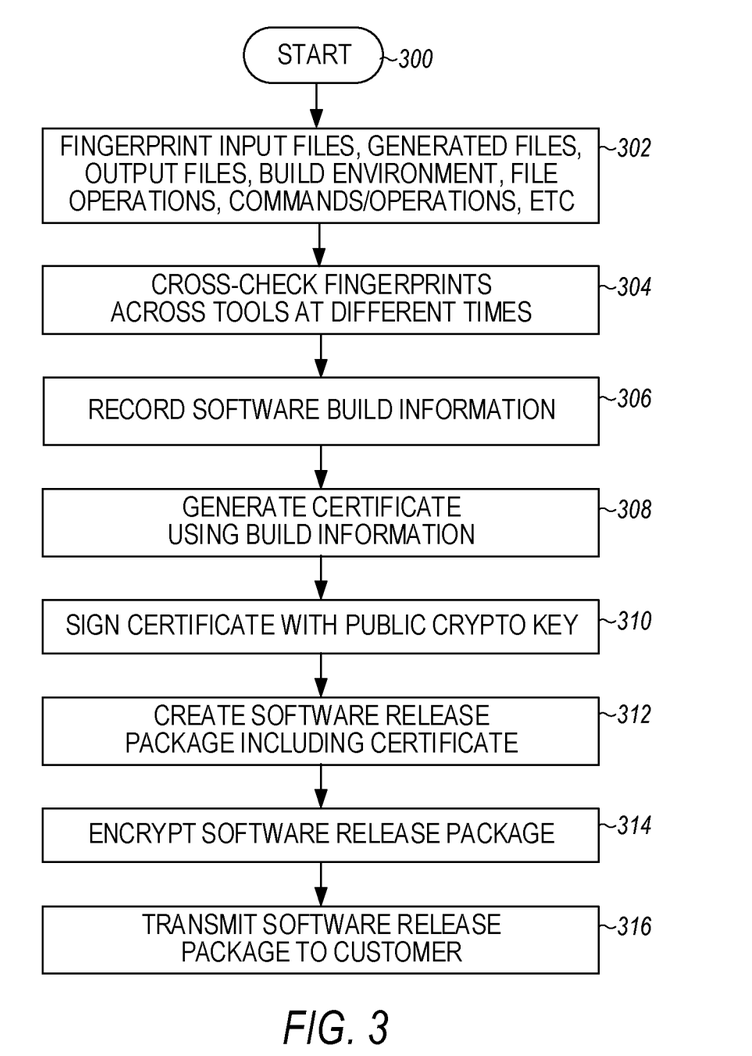
FIG. 3 is a flowchart of a method implemented by the trustworthy software build (TSB) device used by a software developer to create a trusted software release package in a sample embodiment.

FIG. 3 is a flowchart of a method 300 implemented by the trustworthy software build (TSB) device 100 to create a trusted software release package in a sample embodiment.

As illustrated in FIG. 3, the TSB device 100 starts the method 300 and generates at 302 fingerprints for input files such as source code files 110 and data libraries, intermediately generated files, output files such as binary files 120, the build environment 130, the software framework of a trustworthy build including the root of trust, file operations performed on the files by TSB tool 100, and/or command/operations performed by TSB tool 100 and other tools during the creation of the binary files 120.

In sample embodiments, a fingerprint can comprise a process or technique for capturing or representing important data points or code elements of hardware devices, machines, and software for purposes of identification, with the goal being enabling subsequent identification of the hardware, data or code being fingerprinted. The fingerprinting therefore captures unique and important aspects of the item being fingerprinted. A fingerprint can be subsequently used to detect a match or mis-match. In the sample embodiments, the fingerprints of the source code and binary files are cross-checked at 304 against a fingerprint reported by another tool used during building of the source code to verify that no modification has been made to a file between an instant of time when the fingerprint of the source code and binary file was generated and an instant of time when the other tool generated a fingerprint.

The build information is recorded by the fingerprint engine 104 at 306 for a given build instance. The build information includes the names and the corresponding fingerprints (e.g., hash values) generated by the fingerprint engine 104 of the input files (e.g., source code and libraries), the names and the fingerprints of the intermediately generated files (optional), the names and the fingerprints of the final binary output files 120, the fingerprints of the build environment 130, the fingerprints of the TSB tool 100, all file operations that have occurred during the build process, and the exact commands/operations and the order of the commands/operations.

A certificate is generated using the build information at 308 by the certificate engine 106. Certificate engine 106 uses a hashing algorithm created by the developer and the customer that is not related to the customer's public key.

The certificate is signed at 310 using the customer's public cryptographic key to generate certificates including hashes of the source code, binary code, and signatures from the tools in the build environment 130 and TSB tool 100.

A software release package 160 including the generated certificate is created at 312, encrypted (hashed) at 314, and transmitted to the customer at 316 by the release package generator 150. The transmitted software release package 160 may include the source code files 110, intermediately generated files (optional), final binary files 120, and the signed certificate 140.

On the other hand, during the trustworthy verification stage at the customer side, the receiver of the software release package 160 can verify the trustworthy relationship between the source code files and the binary files by using the customer's private cryptography key to verify the integrity of the signed certificate 140, i.e., that the signed certificate 140 is free of modifications after being created.

Figure 4:
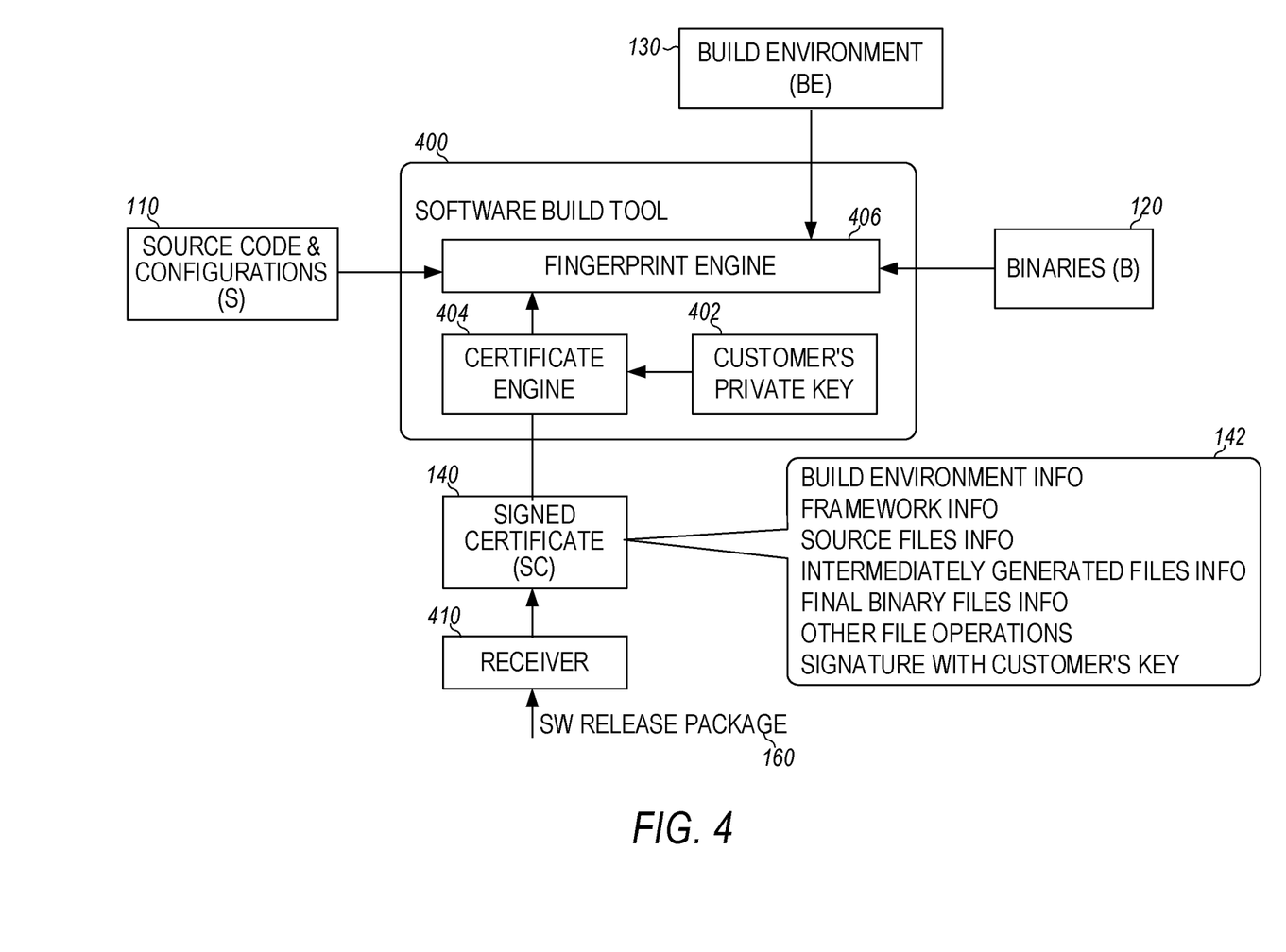
FIG. 4 illustrates the trustworthy software build (TSB) tool used by a customer to verify that a signed certificate received in a release package is valid.

FIG. 4 illustrates the trustworthy software build (TSB) tool 400 used by a customer to verify that a signed certificate received in a release package is valid. As illustrated in FIG. 4, the major components of the TSB tool 400 may include fingerprint engine 406 that includes circuitry, a subroutine, or other means for recording the build data describing the build environment (BE) 130 is provided to the fingerprint engine 104 and for generating a fingerprint for each identified hardware and software element. The TSB tool 400 may also include a certificate engine 404 that includes circuitry, a subroutine, or other means for decoding the signed certificate to extract the data received in the release package including the source code 110 and the binary files 120 using the customer's private key stored in a memory 402, a secure device, or be obtained from a remote server provided by a customer or a trusted party.

In sample embodiments, the trustworthy software build (TSB) tool 400 on the customer side verifies a signed certificate 140 received in the software release package 160 received by receiver 410 by using the customer's private key from memory 402 to enable decoding circuitry, subroutine, or other means of the certificate engine 404 to decode the signed certificate to extract the data received in the release package including the source code 110 and the binary files 120. The trustworthiness information 142 is provided to fingerprint generating circuitry, subroutine, or other means of the fingerprint engine 406, enabling the fingerprint engine 406 to locally generate the fingerprints of the source code files 110 and binary files 120 included in the release package. Comparing circuitry, subroutine, or other means of the fingerprint engine 406 compares the locally generated fingerprints against the corresponding fingerprints captured in the signed certificate 140. It is noted that no command engine is needed on the customer side as building of the binary code 120 from the source code 110 is not necessary.

If both verification stages succeed, the trustworthy relationship between the source code files 110 and the binary files 120 can be established. Otherwise, if either stage fails, the release package cannot be trusted.

Figure 5:
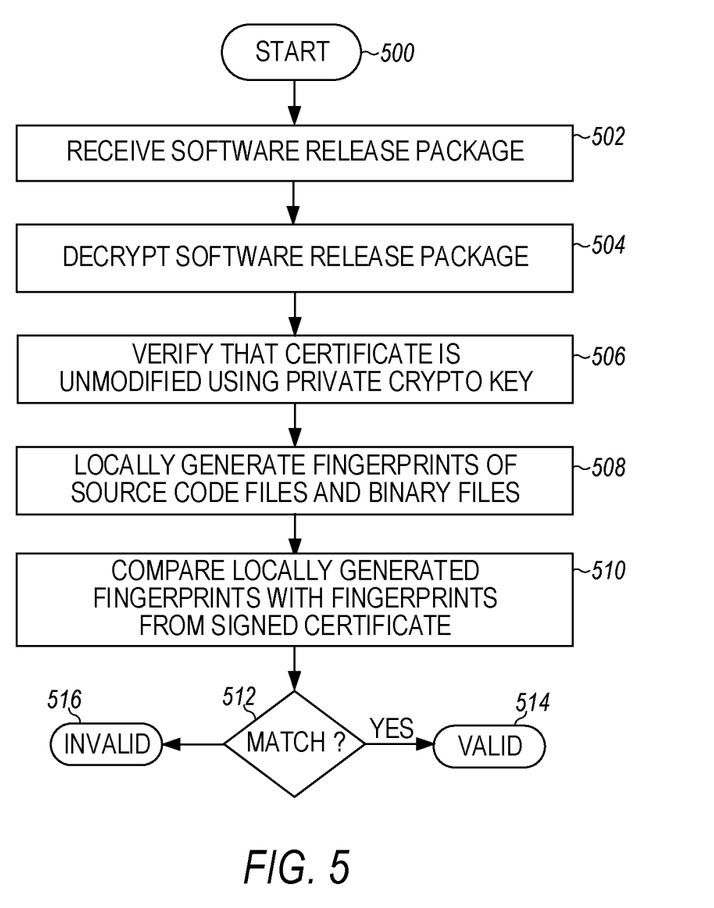
FIG. 5 is a flowchart of a method implemented by the trustworthy software build (TSB) device used by a customer to verify a trusted software release package in a sample embodiment.

FIG. 5 is a flowchart of a method 500 implemented by the trustworthy software build (TSB) device 400 to verify a trusted software release package in a sample embodiment. As illustrated in FIG. 5, the TSB device 400 starts the method 500 and receives a software release package at 502. The software release package 160 includes at least the source code 110, final binary files 120 generated from the source code 110, and a signed certificate 140. In sample embodiments, the signed certificate 140 has been generated using the apparatus and method described above with respect to FIGS. 1-3 and includes build information for establishing the relationship between the source code 110 and the binary files 120 created from the source code 110. The signed certificate 140 is signed with a public cryptographic key provided by the recipient or a trusted third party. As noted above, the build information is recorded during building of the source code and may include build environment information, framework information, source files identification, intermediately generated files information (optional), final binary files information, file operations during building of the source code, and/or commands/operations during building of the source code.

If the software release package has been encrypted, the software release package is decrypted at 504 using a corresponding private cryptographic key.

The recipient's private cryptographic key corresponding to the public cryptographic key used to sign the certificate is used at 506 to verify if the certificate included in the software release package is free of modification.

The trustworthiness information 142 in the certificate is provided to the fingerprint engine 406 to enable the fingerprint engine 406 to locally generate the fingerprints of the source code files 110 and binary files 120 included in the release package at 508.

The locally generated fingerprints are compared against the corresponding fingerprints captured in the signed certificate at 510.

If the fingerprints match, the trustworthy relationship between the source code files 110 and the binary files 120 can be established at 514. Otherwise, the release package cannot be trusted at 516.

It will be appreciated by those skilled in the art that the TSB tool 100 on the software developer side and the TSB tool 400 on the customer side may be implemented via software that is executed by one or more processors on the server side during the software build and on the client side when opening the software release package that has been distributed to the client side. Sample software environments will be discussed below with respect to FIG. 6.

The following table demonstrates how the methodology described herein can be used to discover the possible threats that can arise during a build process. As indicated, the TSB tools described herein enable the customer to verify that the source code files 110 and binary files 120 have not been modified since they were built, and to verify that the build environment 130 and the signed certificate 140 have not been modified since the binary files 120 were built.

TABLE 1

| Possible Threat | How to Discover |
| --- | --- |
| Modify source codes after binary is generated | Verify the signature of the source files (source code hash + signature) |
| Modify binary files after build (e.g. virus) | Verify the signature of the binary files (binary hash value + signature) |
| Modify both source code files and binary files after build | Verify the signature of binary files and source code files (source code and binary hash value + signature) |
| Modify build environment (compiler/linker/etc.) with backdoors | Verify the signature of the build environment (build environment hash + signature) |
| Modify certificate | Verify with customer's private cryptographic key signature |

Those skilled in the art will appreciate that the methodology described herein provides a number of advantages. For example, the information content 142 of the signed certificate 140 may specify the names and the corresponding signatures (e.g., hash values) of the input source code files 110, the names and the signatures of the intermediately generated files, the names and the signatures of the final binary output files 120, the signatures of the build environment 130, the signatures of the TSB tool 100, all file operations that occurred during the build process, the exact commands/operations and the order of the commands/operations, and any other file operation information that is needed to recreate the build process. The information 142 contained in the signed certificate 140 thus defines all the necessary information to be included for checking the trustworthiness of a build process, which eliminates the possibility of undocumented modification of the binary files 120.

Also, the methodology described herein outlines the architecture of the TSB tool 100, which can be used to generate and/or verify the signed certificates 140 of the software build processes and files, thereby enabling the efficient implementation of build tools for the trustworthy build process.

The methodology described herein also provides the advantage that two stages for the trustworthy build process are defined. The first stage is for the software release preparation, which is to be performed by the software provider, whereby a signed certificate is generated. The second stage is for the trustworthiness verification that is to be performed by the customer or other interested third parties, where a signed certificate is verified against the received source files, binary files, and other required information. By decoupling the software release preparation and the trustworthiness verification in this fashion and using the certificate, the contents of the source code files 110 do not have to be investigated. Instead, the build certificate 140 becomes the central piece for the trustworthiness verification. This greatly reduces the effort and knowledge required for the verification process.

The methodology described herein also provides the advantage that the build environment, e.g., compiler/linker, can produce signatures for the input files and the output files, using a signature generation algorithm that is the same as that used by the TSB tool 100. Thus, the signatures captured in the build certificate can be cross-checked with the build environment generated signature information to further improve the trustworthiness of the build process. For a given input/output file, if there is a mismatch between the signature in the build certificate and the signature in generated by the build environment, it can be determined that the build process must have been compromised.

The methodology described herein thus allows for efficient verification that no vulnerabilities or backdoors have been introduced to the binary files 120 during the software build/compilation process. The methodology described herein thus eliminates the requirement to tediously inspect the source code files and binary files for a given software release to confirm whether they correspond to each other. It will be appreciated by those skilled in the art that the certificate methodology described herein may also be applied to many other applications that require a verification process to determine whether the outputs correspond to the inputs for a given process and to thus ensure that the process has not been compromised.

Those skilled in the art will further appreciate that the methodology described herein provides a trust anchor in the form of a signed certificate that provides a trustworthy relationship between the binary files and the source code from which the binary files are generated. The signed certificate provides a simple verification process for establishing trustworthiness whereby modifications to the source code, binary code, and/or building environment during the build and release process may be easily identified. The methodology described herein can replace the tedious and error-prone post-building source code and binary code analysis used in the prior art while extending the verification to the compilers and building tools used to create the binary code. Also, since the methodology may be verified by the customers or a certified third party, the methodology may be used to increase the customer's trust in the software releases.

Figure 6:
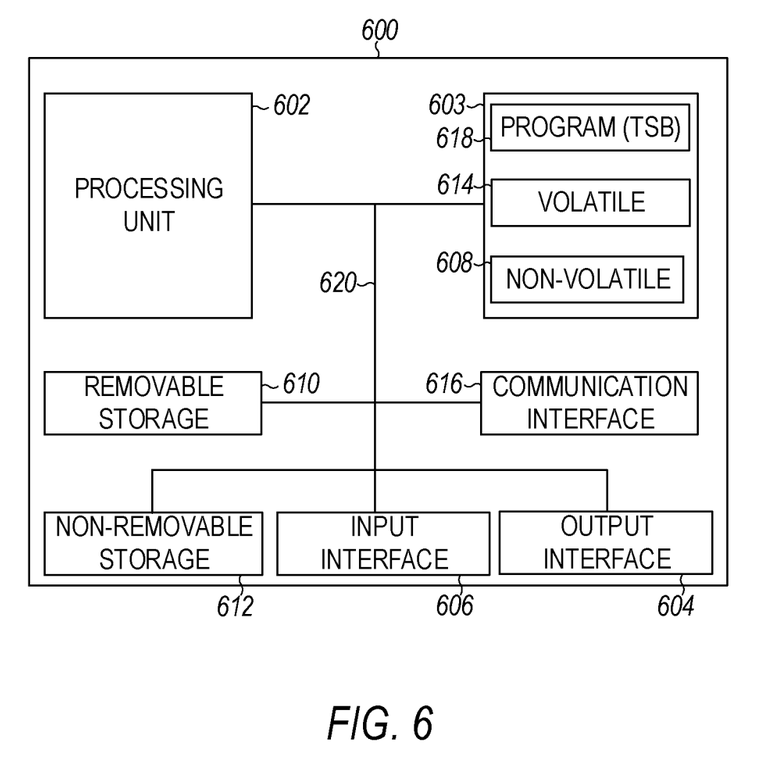
FIG. 6 illustrates a typical, general-purpose network component suitable for implementing one or more embodiments of the apparatus, methods, and computer-readable storage media disclosed herein.

FIG. 6 is a block diagram illustrating circuitry in the form of a processing system for implementing systems and methods, including implementing the TCB tool 100 by a software developer and/or implementing a TCB tool 400 by a customer, as described above with respect to FIGS. 1-5 according to sample embodiments. All components need not be used in various embodiments. One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Devices, such as smartphones, tablets, and smartwatches, are generally collectively referred to as mobile devices or user equipment. Further, although the various data storage elements are illustrated as part of the computer 600, the storage may also or alternatively include cloud-based storage accessible via a network, such as the Internet or server-based storage.

Memory 603 may include volatile memory 614 and non-volatile memory 608. Computer 600 also may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer 600 may operate in a networked environment using a communication connection to connect to one or more remote computers, which may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments includes software that, upon execution by the processing unit 602, performs the functions of the TSB tool 100 on the server side or the TSB tool 400 on the client side according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed to be transitory. Storage can also include networked storage, such as a storage area network (SAN). Computer program 618 also may include instruction modules that upon processing cause processing unit 602 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 602, such that the instructions, upon execution by one or more processors 602 cause the one or more processors 602 to perform any one or more of the methodologies described herein. Accordingly, a "machine-readable medium" refers to a single storage apparatus or device, as well as "cloud-based" storage systems that include multiple storage apparatus or devices.

Those skilled in the art will appreciate that while sample embodiments have been described in connection with methods of providing trustworthy software build tools on the server side and customer side in a sample embodiment, the disclosure described herein is not so limited. For example, the techniques described herein may be used to verify that outputs correspond to inputs of a given process and to ensure that the system has not been compromised during execution of the process.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A computer-implemented method of establishing a trustworthy relationship between a source code and one or more binary files generated from the source code, the method comprising:
   recording build information during building of the source code;
   generating a certificate using the build information, the source code, and the one or more binary files, the certificate establishing a relationship between the source code and the one or more binary files created from the source code; and
   signing the certificate with a public cryptographic key, the signed certificate being usable to verify that the one or more binary files referenced in the signed certificate have been created from the source code referenced in the signed certificate.

2. The method as in claim 1, further comprising providing a software release package, the software release package including at least the source code, the one or more binary files generated from the source code, and the signed certificate.

3. The method as in claim 1, further comprising generating, via a fingerprint generation algorithm, a recorded build information fingerprint.

4. The method as in claim 3, further comprising:
   receiving the recorded build information fingerprint;
   cross-checking the recorded build information fingerprint against a fingerprint generated by a tool used during building of the source code; and
   verifying that no modification has been made to a file between a time that the recorded build information fingerprint was generated and a time that the fingerprint was generated by the tool.

5. The method as in claim 1, further comprising encrypting the signed certificate with the public cryptographic key or another public cryptographic key depending on given build requirements for a given build instance of the source code.

6. The method as in claim 1, the public cryptographic key being provided by a recipient or a trusted third party, wherein the certificate is generated using a hashing algorithm not related to the public cryptographic key.

7. The method as in claim 1, the build information comprising at least one of build environment information, framework information, source files identification, intermediately generated files information, final binary files information, file operations during building of the source code, or commands/operations during building of the source code.

8. A software build tool for establishing establishes a trustworthy relationship between a source code and one or more binary files generated from the source code, comprising:
   a memory storing instructions; and
   at least one processor in communication with the memory, the at least one processor configured, upon execution of the instructions, to perform the following steps:
   record build information during building of the source code and record a build information fingerprint;
   generate a certificate using the build information, the source code, and the one or more binary files, the certificate establish establishing a relationship between the source code and the one or more binary files created from the source code; and
   sign the certificate with a public cryptographic key, the signed certificate being usable to verify that the one or more binary files referenced in the signed certificate have been created from the source code referenced in the signed certificate.

9. The software build tool as in claim 8, the at least one processor being further configured to instruct a compiler to compile the source code into the one or more binary files, organize the source code, identify commands for execution by the compiler, and invoke the compiler to execute the identified commands.

10. The software build tool as in claim 8, the at least one processor being further configured to generate a software release package including at least the source code, the one or more binary files generated from the source code, and the signed certificate.

11. The software build tool as in claim 8, the at least one processor being further configured to encrypt the signed certificate with the public cryptographic key or another public cryptographic key, depending on given build requirements for a given build instance of the source code.

12. The software build tool as in claim 8, the at least one processor being further configured to use a fingerprint generation algorithm to generate a recorded build information fingerprint.

13. The software build tool as in claim 12, the at least one processor being further configured to:
   cross-check the recorded build information fingerprint against a fingerprint generated by a tool used during building of the source code; and
   verify that no modification has been made to a file between a time that the recorded build information fingerprint was generated and a time that the fingerprint was generated by the tool.

14. The software build tool as in claim 8, the public cryptographic key being provided by a recipient or a trusted third party, wherein the certificate is generated using a hashing algorithm not related to the public cryptographic key.

15. The software build tool as in claim 8, the build information comprising at least one of build environment information, framework information, source files identification, intermediately generated files information, final binary files information, file operations during building of the source code, or commands/operations during building of the source code.

16. A software build tool for verifying trustworthiness of binary code received by a recipient, comprising:
   a memory storing instructions and storing a software release package including at least a source code, one or more binary files generated from the source code, and a signed certificate, the certificate including build information, the source code, and the one or more binary files, the signed certificate establishing a relationship between the source code and the one or more binary files created from the source code, the signed certificate being signed with a public cryptographic key and the build information being recorded during building of the source code; and at least one processor in communication with the memory, the at least one processor configured, upon execution of the instructions, to perform the following steps:
- verify the signed certificate included in the software release package is free of modification;
- locally generate fingerprints of the source code and the one or more binary files included in the software release package;
- compare the fingerprints of the source code and the one or more binary files included in the software release package against the locally generated fingerprints; and
- determine that the source code and the one or more binary files included in the software release package are trustworthy when the locally generated fingerprints match the software release package fingerprints.

17. The software build tool as in claim 16, the at least one processor being further configured to decrypt the certificate when the certificate is encrypted.

18. The software build tool as in claim 16, the at least one processor being further configured to implement a fingerprint generation algorithm known to the recipient and a provider of the software release package, the fingerprint generation algorithm generating the fingerprints of the source code and the one or more binary files.

19. The software build tool as in claim 16, the public cryptographic key being provided by a recipient or a trusted third party, wherein the certificate is generated using a hashing algorithm not related to the public cryptographic key.

20. The software build tool as in claim 16, the build information comprising at least one of build environment information, framework information, source files identification, intermediately generated files information, final binary files information, file operations during building of the source code, or commands/operations during building of the source code.

* * * * *

UNITED STATES PATENT AND TRADEMARK OFFICE
CERTIFICATE OF CORRECTION

| | | |
|---|---|---|
| PATENT NO. | : 11,520,902 B2 | |
| APPLICATION NO. | : 16/812090 | |
| DATED | : December 6, 2022 | |
| INVENTOR(S) | : Liu et al. | |

It is certified that error appears in the above-identified patent and that said Letters Patent is hereby corrected as shown below:

In the Claims

In Column 16, Line 5, in Claim 8, after "certificate", delete "establish"

Signed and Sealed this
Seventh Day of March, 2023

Katherine Kelly Vidal
Director of the United States Patent and Trademark Office